United States Patent [19]

Hornbaker et al.

[11] 4,104,459
[45] Aug. 1, 1978

[54] TREATING POLYVINYL CHLORIDE RESINS

[75] Inventors: Edwin D. Hornbaker; Adam Nugent, Jr., both of Baton Rouge, La.

[73] Assignee: Ethyl Corporation, Richmond, Va.

[21] Appl. No.: 670,239

[22] Filed: Mar. 25, 1976

Related U.S. Application Data

[63] Continuation of Ser. No. 498,547, Aug. 19, 1974, abandoned.

[51] Int. Cl.$^2$ .......................... C08F 6/24; C08F 6/00
[52] U.S. Cl. .................... 528/499; 526/344; 528/501
[58] Field of Search ............... 528/499, 500; 526/344

[56] References Cited

U.S. PATENT DOCUMENTS

| | | | |
|---|---|---|---|
| 2,482,038 | 9/1949 | Temple | 528/499 |
| 3,052,663 | 9/1962 | Bodlaender | 528/498 |
| 3,644,319 | 2/1972 | Seki | 528/499 |
| 3,954,910 | 5/1976 | Kropp | 260/879 |
| 3,956,249 | 5/1976 | Goodman | 528/500 |

FOREIGN PATENT DOCUMENTS

| | | | |
|---|---|---|---|
| 1,248,943 | 8/1967 | Fed. Rep. of Germany | 528/500 |
| 2,331,895 | 1/1974 | Fed. Rep. of Germany | 528/500 |

*Primary Examiner*—Christopher A. Henderson, Jr.
*Attorney, Agent, or Firm*—Donald L. Johnson; John F. Sieberth; E. Donald Mays

[57] ABSTRACT

A method for reducing the vinyl chloride monomer content of polyvinyl chloride resins. The polyvinyl chloride-water slurry is placed in a vessel, and heat is applied to the vessel for a sufficient time to raise it to a suitable temperature for removal of vinyl chloride monomer from the resin. The resin slurry is agitated and also subjected to a vacuum to reduce the temperature during the heat stripping step. In a preferred method, the polvinyl chloride-water slurry is agitated in a closed vessel, heat is applied to rapidly heat the slurry to a temperature of at least about 50° C, and vacuum is applied to the vessel. The slurry is then rapidly cooled by suitable means. The slurry is then dewatered and dried. Dried polyvinyl chloride resins produced by this process have been found to have a vinyl chloride monomer content below a detectable limit of about 2.0 ppm.

9 Claims, No Drawings

TREATING POLYVINYL CHLORIDE RESINS

This is a continuation of application Ser. No. 498,547, filed Aug. 19, 1974, now abandoned.

BACKGROUND OF THE INVENTION

1. Field of the Invention

This invention relates to a method for treating polyvinyl chloride suspension resins to reduce the vinyl chloride monomer content thereof.

2. Description of the Prior Art

In conventional processes for producing suspension polyvinyl chloride resins, the unreacted vinyl chloride monomer is removed from the suspension and/or resin in a number of different steps in the finishing process. A major portion of the unreacted vinyl chloride monomer may be removed by evacuating the polymerization autoclave to flash the unreacted monomer. Alternatively, the resin-monomer-water product may be transferred to a degassing vessel and vacuum applied to flash the monomer which is then condensed or otherwise recovered. Further reductions of the monomer content of the resin-water suspension can occur in vented holding or staging tanks wherein the product from the autoclave is held for some period of time prior to further processing. The vinyl chloride monomer content is significantly lowered in the final dried PVC resin product during the drying step. The PVC slurry is then separated into aqueous and dry components by conventional means such as centrifuging and/or filtering, and the wet filtrate is then dried by conventional means such as a rotary dryer or a dryer which blows heated, dehumidified air through the resin particles as they are conveyed through a closed system or as they are contained in a drying vessel. Conventional suspension polyvinyl chloride resins dried according to the foregoing conventional procedures have been found to contain, for example, from about 25 parts per million to about 4,000 parts per million vinyl chloride monomer in the final dried resin product, depending upon the nature of the particular resin produced.

Recently the vinyl chloride monomer content of polyvinyl chloride resins has become a matter of great concern to the public, the government, and the industrial producers of these resins. Governmental agencies are proposing maximum levels of vinyl chloride monomer in air surrounding polyvinyl chloride production facilities. Regulations are also proposed for limiting the emission of vinyl chloride monomer to the atmosphere. Additionally, standards for maximum levels of vinyl chloride monomer content in PVC resins that are certified for use in producing items such as film, bottles or jars that are ultimately used to package food or cosmetic products are anticipated.

In view of the foregoing, it is seen that there is a pressing need for a process for both reducing the vinyl chloride monomer emissions from suspension polyvinyl chloride plants and also to reduce the vinyl chloride monomer content of the PVC suspension resins which are produced by these plants.

SUMMARY OF THE INVENTION

It is an object of the present invention to provide a process for producing polyvinyl chloride suspension resins that results in a low loss of vinyl chloride monomer to the atmosphere.

It is a further object of the present invention to provide a method for producing polyvinyl chloride resins containing a very low content of vinyl chloride monomer.

It is a still further object of the present invention to provide a process for reducing the vinyl chloride monomer content in the polyvinyl chloride suspension resins, which process is efficient, economical and readily integrated into the conventional processing system of polyvinyl chloride suspension resin manufacture.

The process of the present invention for treating particles of polyvinyl chloride resin to reduce the vinyl chloride monomer content of the resin particles is carried out by suspending particles in an aqueous medium in a closed vessel. The vessel is heated to the desired temperature and a vacuum is applied. Heat is applied to the vessel to maintain it at the desired temperature for a period from about one minute to about 180 minutes. The suspension is then cooled, and the resin particles are separated from the aqueous medium and dried.

DESCRIPTION OF THE PREFERRED EMBODIMENTS

The invention broadly comprises subjecting a suspension of polyvinyl chloride resin particles in an aqueous medium, while agitating the medium, to a vacuum to reduce the boiling point of the aqueous medium and heating the suspension to a temperature sufficiently high to permit rapid removal of the vinyl chloride monomer contained in the aqueous phase and occluded in the porous resin particles. One of the primary criteria of the present invention is the utilization of appropriate heating temperatures and heating times to effectively remove the vinyl chloride monomer from the resin particles without producing any significant adverse effects on the properties of the dried, finished polyvinyl chloride resin. It is well known that exposure of polyvinyl chloride resins to excessive temperatures will produce thermal degradation of the resin that will render it unsuitable for commercial use. Quite unexpectedly, it has been found that it is possible to heat suspension polyvinyl chloride resins in an aqueous suspension to temperatures of less than 100° C for a sufficient period of time to significantly reduce the vinyl chloride monomer content of the resin particles without adversely deteriorating the quality of the finished resin particles.

Customarily, polyvinyl chloride suspension resins are produced in a number of grades which are suited for particular end use in fabrication of finished products. Customarily, these resins are classified into grades primarily according to the average molecular weight of the suspension resin. The particles of resin in each of these different grades or types are characterized by having a porosity which is slightly different from adjacent types or grades. The lower molecular weight resins, in general, have a lower porosity than do the higher molecular weight resins. It has been found that the porosity of the resin particles is directly related to the ease with which vinyl chloride monomer occluded in the resin particles can be removed therefrom. Surprisingly, the present invention permits the PVC resin particles to be heated to elevated temperatures for relatively long periods of time to produce a significant reduction in the monomer content of the resin without producing a significant densification (loss of porosity) of the finished resin. Quite unexpectedly, it has also been found that the polyvinyl chloride resins that have been treated by the process of the present invention do not suffer any significant adverse effect on other important physical characteristics such as initial color and dynamic thermal stability.

The polyvinyl chloride resins that can be treated by the process of the present invention include all of the polyvinyl chloride polymers which are composed predominantly of polymerized vinyl chloride. Thus, there may be utilized the homopolymers of vinyl chloride and the multicomponent copolymers or interpolymers made from monomeric mixtures containing vinyl chloride, together with lesser amounts of other copolymerizable mono-olefinic materials. Exemplary of some of the mono-olefinic materials which may be interpolymerized with vinyl chloride are the vinylidene halides, such as vinylidene chloride and vinylidene bromide; vinyl esters, such as vinyl acetate, vinyl propionate, vinyl butyrate; acrylic and alpha-alkyl acrylic acids and their alkyl esters, their amides and their nitriles; vinyl aromatic compounds, such as styrene, dichlorostyrene; alkyl esters of maleic and fumaric acid, such as dimethyl maleate and diethyl maleate; vinyl alkyl ethers, such as vinyl methyl ether, vinyl ethyl ether; alpha-olefins, such as ethylene and propylene; and other readily polymerizable compounds containing a single olefinic double bond, especially those containing the $CH_2\!=\!C<$ group. In general, vinyl chloride may be copolymerized with up to about 10 percent weight of the selected comonomer or comonomers.

Among the polyvinyl chloride resins which may be treated by the method of this invention are those that are commonly referred to as suspension polyvinyl chloride resins, e.g., those produced by polymerizing in an aqueous medium containing a protective colloid or other surface active agent in order to obtain an aqueous suspension of the polymer in the form of fine grains or particles. Since procedures and formulations for preparing suspension polyvinyl chloride resins are well known to those skilled in the art, it is not believed necessary to detail such preparation procedures herein.

The process of the present invention may also be carried out on other types of polyvinyl chloride resins such as those produced by the bulk or emulsion polymerization process. Bulk PVC resins may be slurried in an aqueous medium for treatment. Emulsion resins can be coagulated and then subjected to treatment.

In conducting the process of this invention, the PVC resin-water suspension or slurry is placed in a suitable closed vessel and agitated, and heat is applied to the suspension by means of a heating jacket on the vessel, heat coils contained in the vessel, or by any other suitable means. A vacuum is applied to the vapor space provided in the vessel either during or after the heat-up step in order to reduce the partial pressure of the vinyl chloride monomer in the vapor space to facilitate removal of the monomer from the slurry and also to reduce the boiling point of the aqueous suspension to minimize heat effects on the resin. Heat is continuously supplied to the slurry to maintain the boiling temperature, which is determined by the degree of vacuum continuously applied, for a period of time sufficient to significantly reduce the monomer level in the resin particles.

The present process is carried out by subjecting the PVC-water slurry to temperatures in a range of from about 50° C to about 95° C, vacuum in the range of from about 5 in. Hg to about 26 in. Hg, and heating times at the selected temperature of from about one minute to about 120 minutes.

Preferably, the process utilizes a heating time of from about 15 to about 120 minutes at pressures varying from about 6 in. Hg. to about 20 in. Hg. These preferred conditions have been found to be effective in reducing the vinyl chloride monomer content of the finished resin to from below the detectable limit of < 2 ppm to about 500 ppm, depending upon the conditions used and the particular type of resin that is treated. The boiling point range of the resin-water suspension which corresponds to the 6 to 20 in. Hg vacuum range is from about 60° C to about 90° C.

The temperature at which the resin slurry is vacuum stripped (and thus the degree of vacuum applied to the slurry) and the length of time that the slurry is stripped will be dependent upon the type or grade of PVC resin being treated. For PVC resins having a relative viscosity of about 2.50, a temperature range of from about 60° C to about 80° C for a time period of from about 30 minutes to about 60 minutes is generally most satisfactory. For PVC resins having a relative viscosity of about 2.25, a temperature range of from about 50° C to about 80° C for a time period of from about 30 minutes to about 60 minutes is generally most satisfactory. For PVC resins having a relative viscosity of about 2.00, a temperature range of from about 50° C to about 80° C for a time period of from about 30 minutes to about 120 minutes is generally most satisfactory. For PVC resins having a relative viscosity of about 1.85, a temperature range of from about 60° C to about 90° C for a time period of from about 15 minutes to about 60 minutes is generally most satisfactory. For PVC resins having a relative viscosity of about 1.60, a temperature range of from about 65° C to about 85° C for a time period of from about 30 minutes to about 60 minutes is generally most satisfactory. The foregoing relative viscosities are determined by the same procedures as that described below for the Ethyl PVC resins.

After vacuum stripping, one or more batches of treated resin-water slurry may be either collected in a suitable slurry holding tank or fed directly from the vessel to a centrifuge or other suitable dewatering device to separate the aqueous and resin phases. The wet cake from the dewatering device or centrifuge is then fed to a suitable drying device, for example, a rotary dryer, to dry the resin to the desired water content and to remove additional residual vinyl chloride monomer. The dried, finished resin is then transferred by conventional means to suitable storage silos or to bagging or, if desired, directly to a polyvinyl chloride compounding line for addition of conventional additives to prepare specialty PVC compounds.

The following examples will illustrate specific embodiments of the invention and the details employed in the practice of the invention. The examples should not be construed as limiting the invention. In the examples, parts and percentages are by weight unless otherwise indicated.

The stripping tests performed and documented in the following examples were carried out using suspension homopolymer polyvinyl chloride resins prepared according to the standard recipes of Ethyl Corporation for its commercial resins. These commercial resins are identified by the following Ethyl designation numbers: SM-160, SM-185, SM-200, SR-225, SF-225 and SM-250. These resins have relative viscosities as measured in cyclohexanone using 0.94 grams of PVC and 100 ml of cyclohexane at 25° C as follows: SM-160, 1.60; SM-185, 1.85; SM-200, 2.00; SF-225 and SR-225, 2.25; and SM- 250, 2.50. The PVC-water slurries or suspensions utilized in the following stripping tests were the suspensions resulting from the polymerization of vinyl chloride monomer in bench scale, pilot plant or plant size stirred autoclaves. Most of the PVC-water slurries used in the tests had been subjected to conventional vacuum evacuation in the autoclave or in a degassing vessel for removal of the major portion of the unreacted vinyl chloride monomer from the slurry prior to being subjected to the stripping tests. The PVC-water slurries used in the following experiments contained from about 28 to about 40 weight percent resin based on the total weight of the resin-water slurry.

The properties of the PVC resins set forth in the following examples were determined by the following analytical procedures:

A. Bulk Density

Determined by conventional means, i.e., by determining the weight of a known volume of resin which has been allowed to flow freely into a container of a given volume.

B. Particle Size Distribution

The fraction (weight percent) of a sample of resin remaining on a series of standard sieves of varying mesh sizes. Distribution is determined by adding a sample of resin to the top sieve of a series of sieves arranged according to decreasing mesh size and subjecting the sieves to a vibratory motion for a fixed period of time. Graphite may be added to the resin sample as a lubricant, if desired.

C. Yellowness Index and Color Slope

Sample resin is prepared in a test formulation by mixing with a stabilizer, a lubricant, and, optionally, other additives and milling on a roll mill at a temperature of 350° F. Samples are taken at fixed time intervals and pressed between polished plates until cool. Yellowness index is measured using a Hunter Colormeter D 25. A graph is prepared of the yellowness index versus time. The yellowness index reported in the examples is the value determined for the sample taken at one minute. The color slope is the slope of the plot of yellowness index versus time.

D. Dynamic Thermal Stability (DTS) (Initial Color)

Resin thermal stabilities were measured using a Brabender Plasti-Corder Type REO-6 and a No. 6 roller head manufactured by C. W. Brabender Instruments, Inc. A test formulation is prepared by blending a resin sampler with a stabilizer, a lubricant and, optionally, other additives. The formulation is fed to a Plasti-Corder which is set for a fixed rpm and temperature. Samples of uniform size are removed at fixed time intervals and visual observation of initial color is made. Processing of the samples is continued until there is an abrupt increase in torque. The DTS is the time increment from fusion until the increase in torque.

E. Planetary Dry-Up

A fixed quantity of resin and plasticizer are added to a Brabender Plasti-Corder equipped with a planetary chamber at a fixed temperature and rpm. The time for complete absorption of the plasticizer which is the planetary dry-up time is determined by measuring the time interval until an abrupt change in torque occurs.

F. Vinyl Chloride Monomer in Polyvinyl Chloride

Instruments:

1. Gas Chromatograph Varian 1740 or equivalent equipped with dual flame ionization detectors. Columns: 16 feet by 1/8 inch thin wall (.012 in.) stainless steel tubing packed with 16.7 percent 1,2,3,tris(2-cyanoethyl)propane (TCEP) on Chromosorb W. AW, 70/80 mesh. Columns are to be arranged for on-column injection.

2. Strip Chart Recorder o - 1 millivolt full scale 1 inch per minute chart speed Procedure:

1. Standard Solution: Fill to the mark a 1000 ml volumetric flask with tetrahydrofuran (THF) and add to it exactly 40 microliters of ethyl bromide. This provides a 65 ppm solution of ethyl bromide.

2. Weigh exactly 2.50 g of PVC sample into an Erlenmeyer flask and pipette 50 ml of standard solution into the same flask. Add a stirring bar, cover with a cap, and magnetically stir the mixture until the sample is dissolved or gives a homogeneous suspension.

3. Inject 5 microliters of solution into the gas chromatograph under the following conditions:

Injection Temp; 100° C
Detector Temp; 250° C
Oven Temp; 75° C
Helium Flow; 40 cc/min. (60 lb)
Electrometer Range; $10^{-11}$ amps/mv
Attenuator; 2

4. The attenuation may need switching from sample to sample in an effort to keep the vinyl chloride peak and ethyl bromide peak on scale. If at any time the peaks exceed the limit of the chart paper, the sample must be rerun.

5. After the peaks of interest are collected, the analyst must wait for complete elution of THF solvent before the next sample is injected.

6. At the end of a series of samples, elevate oven temperature to 150° C for approximately one hour.

7. Measure the areas of the peaks representing vinyl chloride and ethyl bromide and calculate the ppm vinyl chloride using the following arithmetic:

(Av/As) × .388 × 65 × 17.6 = C

Av = Area of vinyl chloride peak
As = Area of ethyl bromide peak
C = ppm, by weight, of vinyl chloride in the sample.

Precision and Accuracy:

The precision and accuracy of the method has been shown to be ±10-20 percent relative at the 1 ppm level with a lower limit of detection of 2.0 ppm.

EXAMPLES 1–11

PVC (SM-185) resin-water slurry was prepared by polymerization in a pilot plant autoclave in two runs identified as R-1226 and R-1228 in Table I. The vinyl chloride monomer content of the degassed resin-water suspension of each of these runs was determined prior to conducting the vacuum stripping operation. Nine separate sample portions of PVC-water slurry from polymerization runs R-1226 and R-1228 were subjected to separate vacuum stripping in a stirred 2-liter resin flask that was immersed in a temperature controlled water bath to supply heat to the slurry during vacuum stripping. The water bath was also used for cooling the slurry back to room temperature at the conclusion of the vacuum stripping operation. Vacuum was applied to the vapor space in the resin flask using an electrically driven standard laboratory vacuum pump protected by a cold trap to condense the vinyl chloride monomer and water. A vacuum controller in the vapor line was used to set the vacuum level in the vapor space of the resin flask.

The stripping times and temperatures, together with the vinyl chloride monomer content in the stripped resin samples (after drying), and the initial color determined on some of the resin samples are set forth in Table I. Vinyl chloride monomer in dried resin from the unstripped slurry and in the vacuum stripped dried resin was determined by the gas chromatographic techniques described above. From these examples, it can be seen that, by vacuum stripping PVC resin-water slurries at times ranging from 15 minutes to two hours and temperatures ranging from 60° C to 90° C, the vinyl chloride monomer content in the dried resin can be reduced by from about 75 percent to about 94 percent. The results

TABLE I

PVC (SM-185) SLURRY VACUUM STRIPPING TESTS

| Example No. | Sample Identif | Stripping Time | Stripping Temp., °C | VCl in PVC[a] ppm | Initial Color[b] |
|---|---|---|---|---|---|
| 1 | R-1226 | Unstripped | — | 2100 | OK |
| 2 | R-1228 | Unstripped | — | 3500 | OK |
| 3 | R-1226 | 30 min. | 63° C bath temp. | 110 | — |
| 4 | R-1226 | 2 hrs. | 60 | 530 | Poor |
| 5 | R-1226 | 2 hrs. | 65 | 280 | — |
| 6 | R-1228 | 1 hr. | 70 | 480 | OK |
| 7 | R-1226 | 1 hr. | 71 | 330 | — |
| 8 | R-1226 | 30 min. | 78 | 330 | — |
| 9 | R-1226 | 30 min. | 79 | 410 | — |
| 10 | R-1228 | 30 min. | 80 | 520 | — |
| 11 | R-1228 | 15 min. | 90 | 220 | — |

[a]VCl in PVC after drying.
[b]Initial color of PVC compound formulation.

indicate that the efficiency of vinyl monomer removal is much more dependent upon the temperature of the slurry during vacuum stripping than it is upon the stripping time. Further, Example 4 indicates that stripping times as long as 2 hours even at the moderate temperature of 60° C may result in a resin having inferior initial color.

EXAMPLES 12–31

Samples of PVC-water slurries were obtained from commercial plant autoclaves utilizing conventional recipes to produce the PVC suspension homopolymer resins, one autoclave producing Ethyl SM-200, another autoclave producing Ethyl SR-225, and a third autoclave producing Ethyl SM-250. Samples of the PVC-water slurries from these three plant runs that had previously been degassed were placed in the same 2-liter resin flask with stirrer and the flask placed in the controlled temperature bath used in Examples 1–11. Vacuum was applied to the flask to vacuum strip the VCl monomer from the PVC-water slurry. Various temperatures were utilized, which temperatures established the vacuum level for each of the runs. Stripping temperature, time and vinyl chloride content in the PVC resin, together with the results of the tests performed on the resin after stripping and drying are shown in Table II. From the foregoing data, it can be seen that for maximum removal of VCl monomer from the PVC resins under the drying conditions employed, the vacuum stripping conditions are: for SM-200 PVC resin, 60° C for 120 minutes is required; for SR-225 resin, 60° C for 30 minutes is required; and for SM-250 resin, 60° C for 60 minutes is required. Samples of the dried resins were used to prepare standard PVC compounds (i.e., addition of stabilizers, flow aids, impact modifiers, color additives, etc.) and evaluation

TABLE II

PVC SLURRY VACUUM STRIPPING TESTS

| Example No. | Resin | Stripping Temp., °C | Stripping Time, min. | VCl in PVC[a] ppm | Initial Color[b] | DTS,[b] min. | Bulk Dens. g/cc |
|---|---|---|---|---|---|---|---|
| 12 | SM-200 Control | — | — | 430 | OK | 10.0 | 0.53 |
| 13 | SM-200 | 67–80 | 60 | 2.3 | Poor | 9.0 | 0.52 |
| 14 | SM-200 | 64–80 | 30 | 9.0 | — | — | — |
| 15 | SM-200 | 60 | 120 | 2.0 | OK | 10.0 | — |
| 16 | SM-200 | 60 | 90 | 18.0 | — | — | 0.52 |
| 17 | SM-200 | 60 | 60 | 20.0 | — | — | — |
| 18 | SM-200 | 50 | 120 | 14.0 | — | — | 0.54 |
| 19 | SR-225 Control | — | — | 71.0 | OK | 14.0 | 0.55 |
| 20 | SR-225 | 75 | 60 | 9.0 | Poor | 16.0 | 0.57 |
| 21 | SR-225 | 72 | 30 | 36.0 | — | — | — |
| 22 | SR-225 | 60 | 120 | 2.0 | OK | 13.5 | 0.56 |
| 23 | SR-225 | 60 | 60 | 2.0 | — | — | — |
| 24 | SR-225 | 60 | 30 | 2.0 | — | — | — |
| 25 | SR-225 | 50 | 120 | 24.0 | — | — | — |
| 26 | SM-250 Control | — | — | 8.4 | OK | 7.5 | 0.51 |
| 27 | SM-250 | 69–80 | 60 | 2.0 | OK | 7.0 | 0.52 |
| 28 | SM-250 | 70 | 30 | 2.0 | — | — | — |
| 29 | SM-250 | 60 | 120 | 2.0 | OK | 7.5 | 0.53 |
| 30 | SM-250 | 60 | 60 | 2.0 | — | — | — |
| 31 | SM-250 | 50 | 120 | 14.0 | — | — | 0.50 |

[a]After each test, slurry was centrifuged, then dried at 60° C for 1.25 hours. VCl content was run on the dry resin.
[b]Variations in initial color and dynamic thermal stabilities were determined on the Brabender.

of the compounded samples for initial color and dynamic thermal stability indicated that the vacuum stripped samples, with the exception of Example 20, were satisfactory in all respects for use in commercial PVC compound formulations.

EXAMPLES 32–49

PVC resin-water slurry samples were obtained from the polymerization autoclaves in a commercial plant operation during runs made on the following types of resins: SM-185, SM-200, SR-225, SF-225 and SM-160. Additionally, a PVC resin-water slurry was obtained from a single run made in a pilot plant autoclave for an SM-160 PVC resin. Vinyl chloride monomer content in the slurries that had previously been degassed was determined before vacuum stripping operations were undertaken in the 2-liter resin vacuum flask used for the stripping tests (same equipment used as in Examples 1–31). The samples were vacuum stripped at various vacuum levels for various lengths of time. The results of the analyses and tests on the samples of Examples 32–49 are set forth in Table III. From the data on Examples 48

49, it can be seen that in order to obtain significant removal of VCl monomer from SM-160 resin, it should be vacuum stripped at conditions more stringent than those utilized in Example 49. The optimum conditions for vacuum stripping the other resins over the range of conditions tested are: for SM-185, stripping at 60° C or more for at least 20 minutes or more; for SM-200, stripping at 55° C to 70° C for 30 to 60 minutes; and for SF-225, stripping at 50° C for 60 minutes.

weight resin does not appear to be quite as adversely affected by the long heating time at this temperature.

From the foregoing, it can be seen that the process of the present invention provides a means for economically and expeditiously reducing the vinyl chloride monomer content of suspension polyvinyl chloride resin. The process has been shown to be capable of application to the reduction of vinyl chloride monomer content of all of the many different types of polyvinyl

TABLE III
PVC SLURRY VACUUM STRIPPING TESTS[a]

| Example No. | Resin | Stripping Temp., °C | Time, min. | VCl in PVC, ppm[b] Before Drying | After Drying | Initial[c] Color | DTS,[c] min. | Bulk Density g/cc |
|---|---|---|---|---|---|---|---|---|
| 32 | SM-185[d] Control | — | — | 3456 | 160 | OK | 13.5 | 0.574 |
| 33 | SM-185 | 65 | 30 | 355 | 150 | — | — | 0.57 |
| 34 | SM-185[d] Control | — | — | 965 | 640 | — | — | 0.57 |
| 35 | SM-185 | 65 | 60 | 607 | 260 | — | — | 0.57 |
| 36 | SM-185 | 80 | 30 | — | — | OK | 12.5 | — |
| 37 | SM-200[d] Control | — | — | 1300 | 110 | — | — | — |
| 38 | SM-200 | 80 | 30 | — | 9.5 | Poor | — | — |
| 39 | SM-200 | 70 | 60 | 430 | 9.4 | — | — | — |
| 40 | SR-225[d] Control | — | — | ~4600 | 71.0 | OK | 14.0 | 0.55 |
| 41 | SR-225 | 55 | 30 | 2200 | 2.0 | — | — | 0.52 |
| 42 | SF-225[d] Control | — | — | 2180 | 2.0 | OK | 12.5 | 0.47 |
| 43 | SF-225 | 60 | 60 | 1300 | 2.0 | OK | 12.5 | 0.50 |
| 44 | SF-225 | 60 | 30 | 667 | — | — | — | — |
| 45 | SF-225 | 50 | 60 | 453 | 2.0 | — | — | — |
| 46 | SM-160[d] Control | — | — | 4200 | 3500 | OK | 14.0 | — |
| 47 | SM-160 | 65 | 30 | 425 | 410 | — | — | — |
| 48 | SM-160[e] Control | — | — | 6100 | 4400 | — | — | 0.54 |
| 49 | SM-160 | 80 | 60 | 566 | 420 | — | — | 0.58 |

[a]In each test boiling was maintained through stripping period by controlling pressure.
[b]After each test, slurry was centrifuged, then dried at 60° C for 1.25 hours. VCl content was determined in some cases on wet stripped samples and in all cases on dry resins.
[c]Variations in initial color and dynamic thermal stabilities were determined on the Brabender.
[d]Plant resin slurries.
[e]Pilot plant resin slurries.

EXAMPLES 50–55

In order to assess the effect of long-term heating during the vacuum stripping operation, PVC resin-water slurries were obtained from the polymerization reactors in the commerical plant for PVC resins SM-200, SR-225 and SF-225. Degassed samples from each of these PVC resin-water slurries were placed in the 2-liter resin flask and held at a constant 60° C temperature at atmospheric pressure for varying periods of time. Results of these tests are set forth in Table IV below.

TABLE IV
PVC SLURRY HEATING TESTS

| Example No. | Resin | Temp., °C | Time, hrs. | Initial Color |
|---|---|---|---|---|
| 50 | SM-200 | 60 | 2.5 | Poor |
| 51 | SM-200 | 60 | 3.0 | Poor |
| 52 | SR-225 | 60 | 2.5 | Poor |
| 53 | SR-225 | 60 | 3.0 | Poor |
| 54 | SF-225 | 60 | 2.5 | OK |
| 55 | SF-225 | 60 | 3.0 | OK |

After the resins were subjected to the heating, they were dried by centrifuging and heating in an oven at 60° C for 1.25 hours, and then the resins were compounded into standard commercial formulations for testing for initial color. As can be seen from the data, PVC resins SM-200 and SR-225 suffer some deterioration of quality when heated at 60° C at atmospheric pressure for 2.5 to 3 hours. PVC resin SF-225 being a higher molecular chloride suspension resins produced in a commercial polyvinyl chloride plant. The process has advantageous features in that it can be readily adapted to existing polyvinyl chloride plant installations with a minimum of economic investment. In many cases, conventional stirred vessels which are already employed in polyvinyl chloride plants can be adapted according to the present invention to carry out the process of reducing the vinyl chloride monomer by vacuum stripping of the resin. An additional advantage of the present process is found in that it does not require any increase in the number of operators to man the polyvinyl chloride plant, and the training of the operators in carrying out the vacuum stripping operation is extremely simple. The present process also provides a significant economic advantage in that the polyvinyl chloride-water suspensions from the autoclave can be processed through the vacuum stripping step in a time of two hours or less which is no longer than the normal degassing time. Thus, no time delay is incurred in full utilization of the PVC plant's autoclaves when the vacuum stripping operation is carried out in a separate vessel.

The present invention is eminently suitable for treating those suspension PVC resins which are commonly used in preparing PVC compounds that are used in food grade applications, such as in film, blow molded, injection molded, for thermoformed plastic bottles and containers which are used to package food and/or cosmetic products, wherein stringent requirements for PVC migration from the container to the contents are expected to be effective in a short time. Heretofore, these types of resins have contained, in some cases, as much as 2,000 parts per million vinyl cloride monomer in the resin which is used to prepare the food grade compounds. Indications are that it will be very difficult, if not impossible, for containers made from resins containing these levels of vinyl chloride monomer to pass the proposed specifications for migration of vinyl chloride monomer into the container content. Using the process of the present invention, it has been demonstrated that the vinyl chloride monomer content of one of these types of resins, e.g., Ethyl SM-185, can be reduced to at least a level of about 260 parts per million in the dried resin as compared to a level of about 640 parts per million in the same resin after drying which had not been vacuum stripped. It is believed that subsequent procedures can be employed in the preparation of the PVC compounds for food grade use which will subsequently reduce the 260 or so parts per million of vinyl chloride monomer in the resin to acceptable levels in the finished compound whereby these compounds may be used to package food grade products and meet the proposed projected specifications for vinyl chloride monomer migration into the package contents.

The process of the present invention provides a further advantage in that it results in far less emission of vinyl chloride monomer to the atmosphere than do previously used processes. By vacuum treating the PVC slurry from the autoclave at elevated temperatures prior to placing it in batch or holding tanks, which oftentimes have been opened to the atmosphere, the present process effectively removes not only the vinyl chloride monomer carried in the aqueous phase but the vinyl chloride monomer which is occluded in the porous PVC particles. The removed monomer is condensed in the vacuum condenser system, and the condensate from this portion of the process can be further treated to recover the vinyl chloride monomer or to destroy it, thus minimizing both atmospheric and surface water pollution from the polyvinyl chloride polymerization process.

While certain embodiments of the invention have been disclosed herein, it is not intended to limit the invention solely to that disclosed. It is readily understood that the process and the conditions of this invention may be varied over considerable limits and that equivalents may be employed without departing from the scope and the spirit of the invention.

What is claimed is:

1. In the method of treating particles of a polyvinyl chloride resin which have a susceptibility to degradation in dynamic thermal stability and an increase in bulk density upon prolonged heating, which have previously been subjected to a flashing step to remove a major portion of the unreacted vinyl chloride monomer therefrom, the improvement for further reducing the vinyl chloride monomer content of the resin particles comprising:

a. suspending the resin particles in an aqueous medium in a closed vessel to form a resin-water slurry;

b. indirectly applying heat to the slurry to maintain the temperature thereof in a range between about 50° C to about 95° C for a time period of from about one minute to about 120 minutes;

c. applying a continuous vacuum in the range of from about 5 in. Hg to about 26 in. Hg to produce boiling of the slurry from the heat applied to the vessel while simultaneously removing from the vessel a vapor phase containing vinyl chloride monomer and the aqueous medium; and d. cooling the slurry to produce resin particles having a vinyl chloride monomer content of less than about 420 ppm (dry resin basis), a dynamic thermal stability of at least 7 minutes and a bulk density of at least 0.5 g/cc.

2. The method of claim 1 wherein said temperature range is from about 60° C to about 90° C, said time period is from about 15 minutes to about 120 minutes, and said vacuum is from about 6 in. Hg to about 20 in. Hg.

3. The method of claim 1 including the steps of separating the resin particles from the aqueous medium and drying the resin particles.

4. The method of claim 1 wherein heat is applied to the slurry through the walls of the vessel.

5. The method of claim 1 wherein the polyvinyl chloride resin has a relative viscosity of from about 1.60 to about 2.50.

6. The method of claim 1 wherein the polyvinyl chloride resin has a relative viscosity in the range of from about 1.60 to about 1.85.

7. The method of claim 1 wherein the polyvinyl chloride resin has a relative viscosity in the range of about 2.00 to about 2.50.

8. The method of claim 6 wherein the polyvinyl chloride resin has a vinyl chloride monomer content of less than 220 parts per million after drying at 60° C for 1.25 hours.

9. The method of claim 6 wherein the polyvinyl chloride resin has a vinyl chloride monomer content of less than 2.0 parts per million after drying at 60° C for 1.25 hours.

* * * * *